United States Patent Office 2,924,717
Patented Feb. 9, 1960

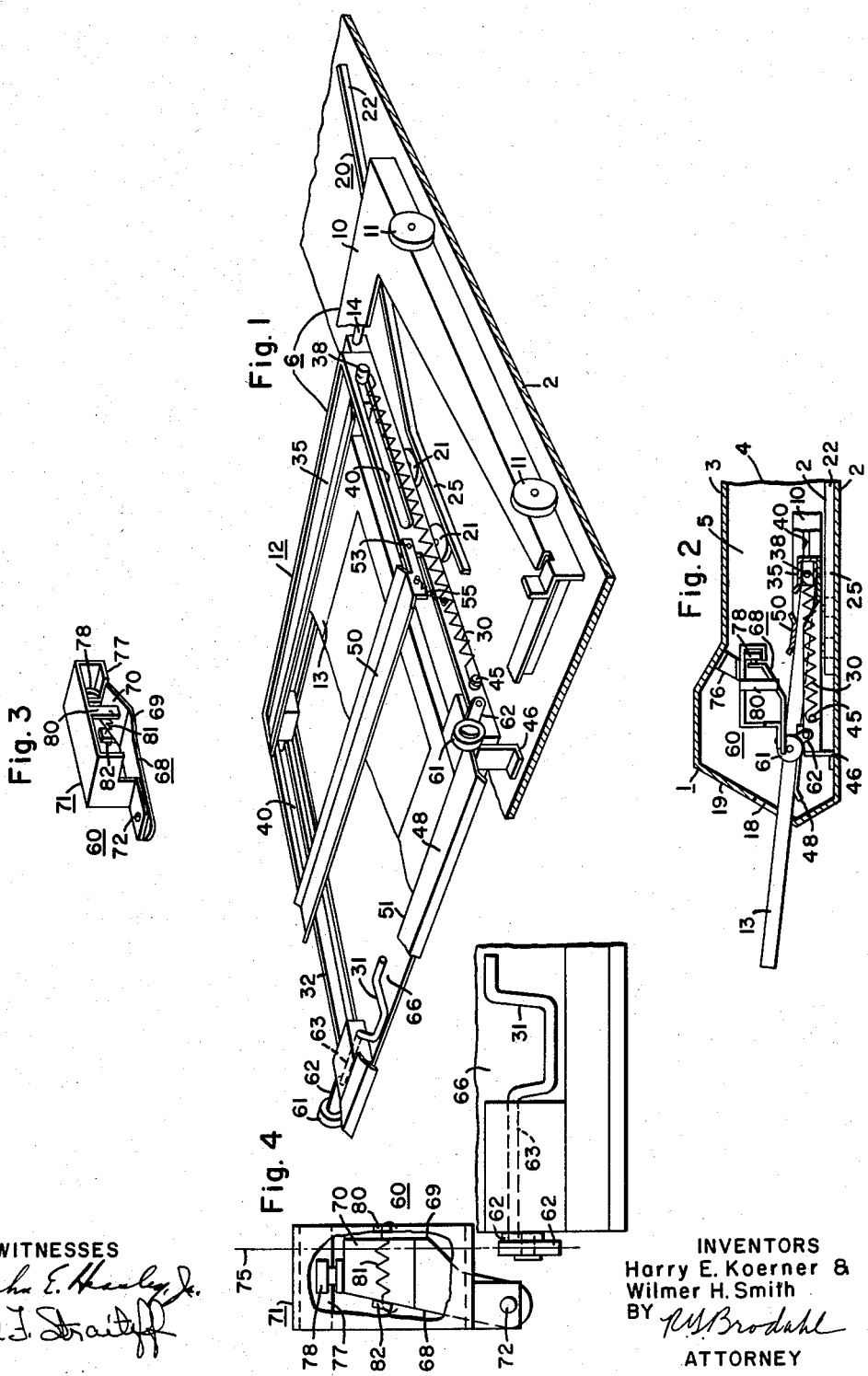

2,924,717

SPOTFILM DEVICE

Harry E. Koerner, Catonsville, and Wilmer H. Smith, Baltimore, Md., assignors to Westinghouse Electric Corporation, East Pittsburgh, Pa., a corporation of Pennsylvania Application September 25, 1958, Serial No. 763,288

8 Claims. (Cl. 250—66)

The present invention relates to spotfilm devices as employed in X-ray fluorographic equipment, and more particularly to improved cassette loading and unloading means embodied in such devices.

A necessary task in the operation of the spotfilm device associated with an X-ray table is the manual loading of film cassettes into the cassette carriage of the device. The usual spotfilm device has a large cassette access opening in an upper face at the rear or table tower end of the device through which the film cassettes may be loaded into and removed from the cassette carriage. With the advent of the image intensifier device, which in the conventional spotfilm device is placed in the locale of the fluorescent screen at the front of the cassette access opening, it has become increasingly more awkward and inconvenient to load and unload film cassettes by way of the usual access opening in the presence of such intensifier device.

In view of the foregoing remarks, it becomes a prime object of the present invention to provide a spotfilm device embodying improved means to facilitate loading and unloading of the film cassettes.

It is another object of the present invention to provide an improved spotfilm device whereby the film cassettes may be loaded and unloaded into and out of the cassette carriage from the front of the spotfilm device.

It is a further object of the present invention to provide an improved spotfilm device whereby the cassettes are automatically shifted in the cassette carriage to a position in projection through the front of the device to facilitate removal during travel of the cassette carriage to its loading position.

Other objects and advantages of the invention will become apparent from the following detailed description of such invention when taken in connection with the accompanying drawing, in which:

Figure 1 is a perspective view of the internal carriage portion of the novel spotfilm device embodying the invention;

Fig. 2 is a side view, partly in outline and partly in section, showing additional details of the novel spotfilm device embodying the invention;

Fig. 3 is a perspective view of a novel retractable cam arrangement embodied in the invention; and Fig. 4 is a schematic representation in plan view of the retractable cam arrangement of Fig. 3 shown in cooperative association with cassette lifting mechanism embodied in the invention.

Referring to Figs. 1 and 2 in the drawing, the novel spotfilm device embodying improved cassette loading and unloading means comprises a housing 1 having parallel spaced-apart plates 2 and 3 joined at opposite edges by side walls 4, one of which is shown in Fig. 2, to define a chamber 5 within which cassette carriage mechanism 6 is disposed for longitudinal movement from a cassette loading position in which such mechanism is shown in Fig. 2 at the front of the housing 1 to a rearward and active position (not shown) in which the cassette-encased film is exposed to X-rays for image recording. In conventional spotfilm devices these loading and active positions are reversed, that is, the active position is located at the front and the loading position is located at the rear of the spotfilm device.

The cassette carriage mechanism 6 comprises a carriage 10 which is shiftable longitudinally within housing 1 between the loading and active positions and guided during such movement by suitable means such, for example, as the inner surface of plates 2 and 3 and side walls 4 through the medium of rollers contacting the surfaces; rollers 11 carried by carriage 10 contacting the plate 2 being shown as an exemplification. Mechanism 6 further comprises a sub-carriage 12 which is adapted to receive a film cassette 13 and which is mounted on carriage 10 through the medium of such as guide rods 14, only one of which is shown, for movement of the film cassette 13 transversely of the housing 1 in the well-known manner to provide the usual four-on-one film exposure technique.

According to the structural features of the invention, the spotfilm device includes means for automatically shifting the subcarriage 12 transversely of the housing 1 during movement of the carriage 10 from an active position to the loading position at the front of the housing, to assure alignment of such subcarriage with respect to a loading aperture 18 in the front wall 19 of said housing. Preferably, though not necessarily, the loading aperture 18 is located equidistant from the side walls 4 of the housing 1, and the subcarriage-shifting means will then act to center the subcarriage 12 with respect to the housing.

Referring to Fig. 1, for sake of illustration, the subcarriage-shifting means to accomplish this purpose may simply comprise a pair of spaced-apart guide elements 20, one of which is shown, attached to the plate 2 for guiding cooperation with the rollers 21 attached to and extending downwardly from the subcarriage 12 at each of its side edges. The guide elements 20 need be suitably shaped and disposed for respective cooperation with the rollers 21 at one side or the other of the subcarriage 12 during its movement toward the loading position, to cause shifting of such subcarriage transversely on the carriage 10 to obtain the proper alignment with respect to loading aperture 18. In this behalf, each of the elements 20 comprises a gathering portion 22 which extends at an angle transversely of plate 2, portions 22 of the two elements 20 extending oppositely so that one or the other will be engaged by respective rollers 21 to obtain the desired shifting of the subcarriage from any transverse position which it may occupy prior to its longitudinal advancement with carriage 10 to the loading position. In addition, it is essential to operational features of the invention, for reasons which hereinafter will become apparent, that, during the final stages of movement of the subcarriage 12 to the loading position, such movement be directed along a prescribed path which preferably is parallel to the longitudinal dimension of the housing 1 and in alignment with the loading aperture 18. To this end, the guide elements 20 are provided with parallel sections 25 along which the respective rollers 21 on the subcarriage 12 will travel to define such prescribed path.

In accord with a feature of the invention, the novel spotfilm device comprises means for automatically lifting one end of the film cassette 13 from the bottom of the subcarriage 12 and advancing such end outwardly through the loading aperture 18 for removal from the spotfilm device. Such automatic lifting and semi-ejecting means comprises bias means in the form of helically wound tension springs 30, one of which is shown in Fig. 1, carried by and disposed at opposite sides of the subcarriage 12 to urge the film cassette toward the front of such subcarriage, and means in the form of a pair of rod-like lift elements 31 carried by and disposed at the front of the subcarriage 12 which extend under the film cassette 13 when positioned for transport by the subcarriage.

Referring to Figs. 1 and 3, the subcarriage 12 comprises two side channel members 32 which define the side and bottom edges of a frame-like receptacle into which the cassette 13 is placed for transport. At the rear of the subcarriage, a transversely extending longitudinally movable socket member 35 is provided to receive the inner end of the cassette 13 and transmit the forward-acting thrust force from the tension springs 30 to the cassette. Oppositely extending pins 38 project from opposite ends of the socket member 35 through guide slots 40 in the vertical sides of channel members 32 to guide such socket member during longitudinal movement thereof relative to such channel members, and serve as connecting means for the tension springs 30 which are anchored at one end to these pins, respectively. The opposite end of each tension spring 30 is anchored to a respective pin 45 attached to the respective channel member 32.

While the subcarriage 12 is disposed in the loading position at the front of the housing 1, as defined by such as engagement of the subcarriage with a stop member 46 attached to the plate 2, and there is no cassette present, the movable socket member 35 will be disposed in the position in which it is shown in Fig. 2, intermediate the front and back of the subcarriage, defined by engagement of the pins 38 with the forward ends of the slots 40 in the side channel members 32, as urged thereto by the springs 30.

According to an operational feature of the invention, the inner end of the film cassette 13 may be introduced into the loading aperture 18 in the front of the housing 1 and advanced to a position as shown in Fig. 2 in which such inner end of the cassette is fed into the movable socket member 35, a guide flange 48 being attached to the forward end of subcarriage 12 to aid in such introduction. Thereafter, continued application or slight manual effort will advance the cassette 13 through the opening 18 into the frame-like receptacle afforded by the subcarriage 12, as the tension force of the springs 30 is thereby overcome and the socket member 35 moves in unison with the cassette along the channel members 32. With the cassette 13 thus fully inserted, effort by a spring-biased pivoted cross member 50 applied to the upper face of the cassette 13, as viewed in the drawing, will cause or assist the forward end of the latter to slide behind retaining means in the form of a transversely-extending vertical shoulder 51 in the forward end of the subcarriage 12, whereby the cassette becomes disposed in the position in which it is shown in Fig. 1 and the spotfilm device thus becomes loaded with the film cassette.

The cross member 50 extends transversely of the subcarriage 12 and is pivotally attached at each end by a respective pin 53 carried by a respective channel member 32 to afford sufficient freedom of movement of such cross member during insertion and removal of the cassette 13 when in a tilted attitude with respect to the subcarriage. A tension spring 55 at each end of the cross member 50 biases same in the direction of plate member 2 and, in addition to urging the cassette 13 to slide behind the shoulder 51 during cassette insertion, aids in retention of the cassette within the subcarriage 12 if the spotfilm device is tilted on its side in conjunction with tilting of the X-ray table, as is standard practice in the art of X-ray photography.

For actuating the cassette lift elements 31 automatically upon return of the subcarriage 12 to the cassette loading position, the spotfilm device is provided with a pair of retractable cam assemblages 60, Figs. 2, 3 and 4, disposed at the front within the housing 1 in spaced-apart relationship for cooperation with a pair of roller followers 61 carried at opposite side edges of the subcarriage 12 and operatively connected to the lift fingers 31, respectively.

The roller followers 61 are carried on the projecting ends of respective arms 62, opposite ends of which are attached to shafts 63 journalled in suitable portions of the subcarriage 12 and attached to the rod-like lift elements 31. Each of the arms 62 normally assumes an upward and forward extending position for normal disposition of the roller followers 61 above the subcarriage 12, such normal position of the arms 62 being defined by contact of the lift elements 31 with bottom elements 66 comprised in the subcarriage 12 when a cassette 13 is in place. In the presence of such film cassette when in loaded position within the subcarriage 12, as shown in Fig. 1, the lift elements 31 will be disposed beneath the front edges of such cassette.

The retractable cam assemblages 60 for actuating the rollers 61 each comprises a cam element 68 having a portion 69 extending parallel to the plates 2, 3 and an inclined portion 70 attached to one end of portion 69, and extending in the direction of plate 3. The opposite end of portion 69 is pivotally connected to a fixed element 71 by a pin 72, Figs. 3 and 4, to provide for movement of the cam element 68 transversely of the subcarriage 12, for reasons which hereinafter will become apparent. The fixed element 71 is attached to the housing 1 for disposition of the cam element 68 in the path of travel, indicated by dot-dash lines 75 in Fig. 4, of the respective rollers 61; a mounting bracket 76 serves to accommodate such attachment of fixed element 71. Element 71 is provided with a transversely extending support track 77 which cooperates with a roller 78 carried by the projecting end of the inclined portion 70 to facilitate pivotal movement of the cam element 68 about the pin 72. A stop finger 80 is attached to the cam element 68 for cooperation with the fixed element 71 to define a normal transverse position of the cam element 68 in which the inclined portion 70 is disposed in alignment with the path of travel 75 of the respective rollers 61, as shown in Fig. 4, and in which the portion 69 extends at an angle transversely away from such path of travel. A bias spring 81 attached at one end to an appendage 82 of the element 71 and at its opposite end to a stop finger 80 urges the cam element 68 toward its aforementioned normal transverse position.

The automatic cassette-lifting and semi-ejecting operation is as follows, the film cassette 13 will occupy the position in the subcarriage 12 in which it is shown in Fig. 1 and such subcarriage together with the carriage 10 will occupy a longitudinal active position within the housing 1 opposite to that in which it is shown in the drawing. From such active position, the carriage 10 will be actuated by means (not shown) toward the loading position at the front of the housing 1 defined by engagement of the front of the subcarriage 12 with the stop member 46. During such movement of the carriage 10, the subcarriage 12, if not already so aligned, will become aligned with the loading aperture 18 at the front of the housing 1 as well as with the cam assemblages 60 disposed within and attached to such housing, by cooperation of the rollers 21 with gathering portion 22 of one or the other of the spaced-apart guide elements 20 attached to the plate 2. In such transversely aligned position of the subcarriage 12, continued longitudinal movement of the carriage 10 will carry such subcarriage along the path prescribed by engagement of the rollers 21 at opposite sides of said subcarriage with the parallel sections 25 of the respective guide elements 20 to cause the rollers 61 at the forward end of the subcarriage to engage the inclined portion 70 of the cam element 68 and become displaced downwardly while actuating lift elements 31 upwardly, as viewed in the drawing, through the medium of the arms 62, and the shaft 63. During such upward movement of the lift elements 31 same will act on the bottom of the cassette 13 to raise the forward end of the cassette out of engagement with the transversely extending shoulder 51 at the forward end of the subcarriage 12, whereupon, the movable socket member 35 under influence of the tension springs 30 will advance the forward end of the cassette 13 slidably along the guide flange 48 and outwardly through the loading aperture 18 to the position in which such cassette is shown in Fig. 2, a position which is readily accessible to the operator who may then grasp this cassette and exert a slight pulling effort to remove same from the spotfilm device.

During the final stages of movement of the carriage 10 in which the subcarriage 12 is caused to assume the loading position defined by contact with the stop member 46, the rollers 61 will travel beyond the inclined portions 70 of the cam element 68 to a position such as shown in Fig. 4 in which each of the rollers 61 has become disposed adjacent to the horizontal portion 69 of the respective cam element 68. Each of such rollers 61 during the final stages of such travel being rolled out of engagement with the cam element 68.

Once a cassette 13 is loaded into the subcarriage 12 via the loading aperture 18 in the housing 1 as aforedescribed, longitudinal movement of the carriage 10 and subcarriage 12 from the loading position to an opposite active position, not shown, is afforded without interference from the cam assemblages 60 by virtue of transverse retraction of cam element 68 out of the path of travel 75 of the rollers 61.

Referring to Fig. 4, during such longitudinal movement of subcarriage 12, the forward end of each roller 61 will slidably engage the side edge of portion 69 of the respective cam element 68, thereby exerting a turning moment which will cause same to pivot laterally of the subcarriage 12 about the pin 72 as the roller 61 is thus permitted to travel past. As the roller 61 thus travels past the side edge of the cam element 68, the said cam element automatically becomes returned by the spring 81 to its normal position, in which it is shown in Figs. 3 and 4, defined by contact of the stop finger 80 with fixed element 71. The retractable cam assemblages 60 are thus automatically conditioned for subsequent operative engagement with the rollers 61 to effect automatic ejection of the cassette 13 during return movement of the subcarriage 12 to the loading position.

Although the invention has been described in connection with a certain specific embodiment, it should be readily apparent to those skilled in the art that various changes in the form and arrangements of parts can be made to suit requirements without departing from the spirit and scope of such invention.

We claim as our invention:

1. In a spotfilm device, the combination of film cassette carriage means movable to and from a cassette loading position, lift means for dislodging a film cassette from said carriage means, actuating means for effecting operation of said lift means responsively to movement of said carriage means toward said loading position, and means for rendering said actuating means inoperative upon said carriage means assuming its loading position.

2. In a spotfilm device, the combination of a housing having a front wall with a cassette loading aperture opening therethrough, cassette carriage means within said housing movable to and from a cassette loading position in proximity of said loading aperture, cassette lifting and shifting means irremovably mounted in said device to dislodge a film cassette from said cassette carriage means and to advance the dislodged cassette longitudinally through said loading aperture, and other means irremovably mounted in said device operable when said carriage means is in its aforesaid loading position to effect operation of said cassette lifting and shifting means.

3. In a spotfilm device, the combination of a housing having a front wall with a cassette loading aperture opening therethrough, cassette carriage means within said housing movable to and from a cassette loading position in proximity of said loading aperture, bias means carried by said cassette carriage means for urging a film cassette toward said loading aperture, cassette retaining means carried by said cassette carriage means to oppose action of said bias means on a film cassette, and actuator means operable to free a film cassette from influence by said cassette retaining means to permit said bias means to advance such film cassette outwardly through said loading aperture.

4. In a spotfilm device, the combination of a housing having a front wall with a cassette loading aperture opening therethrough, cassette carriage means within said housing movable to and from a cassette loading position in proximity of said loading aperture, bias means carried by said cassette carriage means for urging a film cassette toward said loading aperture, cassette retaining means carried by said cassette carriage means to oppose action of said bias means on a film cassette, actuator means operable to free a film cassette from influence by said cassette retaining means to permit said bias means to advance such film cassette outwardly through said loading aperture, and means responsive to movement of said cassette carriage means to its aforesaid loading position to operate said actuator means.

5. In a spotfilm device, the combination of a housing having a front wall with a cassette loading aperture opening therethrough, cassette carriage means within said housing movable to and from a cassette loading position in proximity of said loading aperture, bias means carried by said cassette carriage means for urging a film cassette toward said loading aperture, cassette retaining means carried by said cassette carriage means to oppose action of said bias means on the film cassette, lifting means carried by said cassette carriage means actuable to free a film cassette from influence by said cassette retaining means to permit said bias means to advance such film cassette outwardly through said loading aperture, cam follower means carried by said cassette carriage means and operatively connected to said lift means, and cam means attached to said housing for operative engagement with said follower means during movement of said cassette carriage means to its aforesaid loading position.

6. In a spotfilm device, the combination of a housing having a front wall with a cassette loading aperture opening therethrough, cassette carriage means within said housing movable to and from a cassette loading position in proximity of said loading aperture, bias means carried by said cassette carriage means for urging a film cassette toward said loading aperture, cassette retaining means carried by said cassette carriage means to oppose action of said bias means on a film cassette, lift means carried by said cassette carriage means actuable to free a film cassette from influence by said cassette retaining means to permit said bias means to advance such film cassette outwardly through said loading aperture, cam follower means carried by said cassette carriage means and operatively connected to said lift means, and cam means attached to said housing for operative engagement with said follower means during movement of said cassette carriage means to its aforesaid loading position, said follower means being disengaged from said cam means during the final stage of such cassette carriage movement to permit retraction of said lift means in preparation for subsequent reloading of a film cassette into said cassette carriage means.

7. In a spotfilm device, the combination of a housing having a front wall with a cassette loading aperture opening therethrough, cassette carriage means within said housing movable to and from a cassette loading position in proximity of said loading aperture, bias means carried by said cassette carriage means for urging a film cassette toward said loading aperture, cassette retaining means carried by said cassette carriage means to oppose action of said bias means on the film cassette, lift means carried by said cassette carriage means actuable to free a film cassette from influence by said cassette retaining means to permit said bias means to advance such film cassette outwardly through said aperture, cam follower means carried by said cassette carriage means and operatively connected to said lift means, and cam means attached to said housing for operative engagement with said follower means during movement of said cassette carriage means to its aforesaid loading position, said follower means being disengaged from said cam means during the final stage of such cassette carriage movement to permit retraction of said lift means in preparation for subsequent reloading of a film cassette into said cassette carriage means, and said cam means being retractable to permit said follower means to travel therepast during movement of said cassette carriage means away from said loading position.

8. In a spot film device, the combination of a housing having a front wall with a cassette loading aperture opening therethrough, carriage means movable longitudinally within said housing toward and away from said loading aperture, subcarriage means adapted to receive a film cassette and mounted on said carriage means for movement longitudinally therewith while being shiftable thereon transversely of said housing, guide means carried by said housing for cooperation with said subcarriage means to align same with respect to said loading aperture during movement theretoward, actuating means responsive to longitudinal movement of said subcarriage means toward said loading aperture to effect displacement of the film cassette carried thereby outwardly through said loading aperture, and means for rendering said actuating means inoperative upon said carriage means assuming its position at said loading aperture.

References Cited in the file of this patent

UNITED STATES PATENTS

| | | |
|---|---|---|
| 2,004,232 | Weed | June 11, 1935 |
| 2,063,878 | Linke et al. | Dec. 8, 1936 |
| 2,560,782 | Scholz | July 17, 1951 |
| 2,811,648 | Leishman et al. | Oct. 29, 1957 |
| 2,817,766 | Leishman | Dec. 24, 1957 |